United States Patent Office

2,789,063
Patented Apr. 16, 1957

2,789,063

METHOD OF ACTIVATING THE SURFACE OF PERFLUOROCARBON POLYMERS AND RESULTANT ARTICLE

Robert J. Purvis, St. Paul, and Warren R. Beck, Mahtomedi, Minn., assignors to Minnesota Mining & Manufacturing Company, St. Paul, Minn., a corporation of Delaware No Drawing. Application March 26, 1954,
Serial No. 419,092

18 Claims. (Cl. 117—47)

This invention relates to the surface activation of fluorinated polymer masses having a passive fluorocarbon surface formed of exposed perfluorinated carbon chains, and to articles produced thereby.

Such fluorocarbon surfaces are highly inert and stable and are both oleophobic and hydrophobic, being repellent to, or non-wettable by, oils as well as water. They are passive toward inks, dyes, and adhesives. Adhesive coatings, for example, have a low adherency to such passive surfaces and are readily stripped off or delaminated. Typical fluorinated polymers having these properties include polymerized 1,1-dihydroperfluoroalkyl acrylates as described in U. S. Patent No. 2,642,416; polymerized fluorocarbon vinyl esters as described in U. S. Patent No. 2,592,069; and polymerized perfluoro olefins, particularly polytetrafluoroethylene.

A specific example of a polytetrafluoroethylene article having a passive surface is a wire covering such as described in Sanders Patent No. 2,567,162. The outer sheath of polytetrafluoroethylene, either with or without the ceramic sub-coat of the patent, is highly effective as an insulating layer, both at normal room temperatures and at elevated temperatures. It is also highly resistant to corrosive materials. However the coating is passive toward all types of resins or adhesive materials, and hence the coated wire is not effectively held in place in structures such as coils, transformers, lead-in wires, etc., where the structure is embedded in resins or other potting components or adhesive materials. Moisture and corrosive liquids are enabled to penetrate between the wire covering and the surrounding compound, to the detriment of the device. Since inks do not wet the passive polytetrafluoroethylene surface, effective identification of the coated wire by direct printing thereon has not heretofore been possible. The passive surface is not wetted by transformers or like structures, with attendant losses through encountered where such wires are employed within transformers or like structues, with attendant losses through corona formation. Analogous defects are encountered with blocks, tubes and miscellaneous shaped articles of polytetrafluoroethylene, as well as films, foils and filaments of the material.

The present invention provides methods for activating the normally passive and non-wettable surfaces of polytetrafluoroethylene or equivalent articles so as to render them readily susceptible to the application and retention of inks, dyes, adhesives, waxes and potting compounds, resins, varnishes and other coatings. There are thus provided novel polytetrafluoroethylene articles such as blocks, rods, tubes, and films having an activated surface and which may be employed in the preparation of articles in which resinous polymeric or adhesive compositions are firmly bonded to the activated surfaces of polytetrafluoroethylene components. The desired surface effect is obtained without degradation of the bulk of the polymer. These advantageous results are obtained by methods involving chemical treatment of the fluorocarbon surface by controlled reaction with a suitable fluid metal reactant, preferably an alkali metal, as will now be illustrated by various non-limitative examples.

Example I

An insulated wire consisting of a copper conductor insulated and protected with an outer sheath of fused polytetrafluoroethylene is supported in a highly evacuated container, heated to approximately 380° F., and subjected to the action of lithium vapor over the entire polytetrafluoroethylene surface. The lithium vapor is provided by evaporation of lithium metal from a suitable crucible located closely adjacent the member to be coated and within the vacuum chamber, the crucible being electrically heated. The wire is rotated during deposition of the vapor so that the entire surface is exposed to the direct action of the vaporized metal. The treated insulated conductor is then removed from the vacuum chamber and washed in water to remove water-soluble materials, e. g. lithium fluoride, or lithium hydroxide, nitride, etc. which may be formed on exposure of the coated conductor to air. The product is employed in the form of lead-in wires for electrical coils which are then encapsulated in a resinous potting compound. The resin is found to be firmly adherently bonded to the activated polytetrafluoroethylene surface, whereas similar resins are readily removable from untreated (passive) polytetrafluoroethylene coated wires. Metal foil or screen may be firmly adherently attached to polytetrafluoroethylene wire or cable insulation, insulating blocks or foils, or the like, e. g. as a conductor or for shielding purposes, by first activating the surface of the insulating layer as here described.

The conductor of this example may be insulated with a polytetrafluoroethylene film applied in accordance with the disclosure of Sanders Patent No. 2,567,162 either with or without the ceramic subcoat; or the insulating coating may be applied by any other suitable method. One such method involves spirally wrapping the conductor with a preformed, thin, self-supporting strip or tape of unsintered polytetrafluoroethylene and then sintering the coating by heating to a temperature above about 330° C. Effective results are also obtained when the unsintered porous coating is first lightly treated with the lithium vapor and subsequently sintered.

Example II

A dense, opalescent, thin film of sintered polytetrafluoroethylene is coated on one surface with lithium vapor while at a temperature somewhat above 380° F. and under conditions similar to those described in connection with Example I. The coated surface is washed to remove water-soluble materials and after drying is coated with a layer of normally tacky rubber-resin type pressure-sensitive adhesive. The strip is wound up into roll form with the exposed surface of the adhesive coating in contact with the passive uncoated surface of the polytetrafluoroethylene film. The tape product may be unwound from the roll without transfer or offsetting of the adhesive layer and may be adhered to steel and other surfaces and subsequently stripped therefrom without adhesive transfer or offsetting. Polytetrafluoroethylene films which have not thus been activated do not retain their pressure-sensitive adhesive layers when similarly coated and tested.

Heating of the film is not essential, and in fact the film may be artificially cooled during the vapor treatment, as by passing it over a cold polished metal plate or drum. However, the metal vapor itself is produced at a high temperature and carries a substantial quantity of heat as it contacts the polytetrafluoroethylene surface. Metals having a high specific heat are particularly applicable to the process.

Thin films which are suitable for tape structures as described under Example II may be obtained by skiving from preformed and presintered blocks or rods of polytetrafluoroethylene. They are more effectively produced by calendering and fusing the soft, porous, unfused, extruded films such as were described in connection with the spiral wrapping of conductors in Example I. Effective activation of the film may be carried out in the form either of the fused or of the unfused material.

*Example III*

A dense, opalescent, fused polytetrafluoroethylene film is dipped into a dilute solution of sodium metal in liquid ammonia and is then removed and heated briefly to 220° C. The strip is then washed in water and dried. A pressure-sensitive adhesive tape is pressed against the treated surface and stripped away under controlled conditions. The force required to remove the tape is found to be 18 ounces per half inch width. Under identical conditions, the force required to remove the tape from a strip of the polytetrafluoroethylene film in its initial passive condition is only four ounces. These results indicate effective surface activation.

With 1.5 grams of sodium metal in about 100 cc. of liquid $NH_3$ at $-33°$ C., and with a two-inch length of the strip immersed in the liquid, effective reaction is obtained with the strip advancing at a rate of about 4–6 feet per minute. The reaction is somewhat slower at a concentration of 0.5 gram of sodium in 100 cc. of liquid ammonia. Heating the film as it emerges from the liquid treating bath provides for reaction with any unreacted portion of the deposited sodium, and evaporates the ammonia; but such treatment is not required in providing an effectively activated film surface.

A solution of one gram of calcium in 100 cc. of liquid ammonia is also effective in activating the normally passive polytetrafluoroethylene film surface, although the rate of reaction with such solution is not as great as with a sodium solution of equal concentration.

Liquid ammonia is particularly effective as a solvent for these metals, and is easily evaporated from the treated film, but its extremely high vapor pressure makes its application difficult in many circumstances. Methylamine is an example of alternative amine type solvents which are somewhat less effective but more readily handled and which are useful in the process described in Example III.

*Example IV*

A strip of the untreated polytetrafluoroethylene film of Example III is dipped into a molten alloy of 67 parts tin, 33 parts lead and 2 parts sodium at a temperature slightly above the melting point of the alloy but below the sintering temperature of the polytetrafluoroethylene film, and the treated film is then washed and dried. Adhesion of pressure-sensitive adhesive tape to the treated surface of the film is found to be greatly improved, indicating effective surface activation. In a modification of the procedure the alloy is heated somewhat above the sintering temperature of the polytetrafluoroethylene and an unsintered film, as described in Example I hereof, is passed through the melt, thus becoming simultaneously sintered to the fused state and activated at the surface.

*Example V*

A dense, sintered film of polytetrafluoroethylene having a surface which is passive toward adhesive materials such as inks, varnishes, pressure-sensitive adhesives, etc. is covered with powdered sodium hydride which is gently and uniformly rubbed into the surface. The treated film is heated under a helium atmosphere and at a temperature of approximately 350° C. The film is then washed and dried, and is found to be active toward adhesive materials. Equally effective results are obtained with calcium hydride.

In probable explanation of the surprising and useful results attained, it is suggested that the fluid metal reactant reacts with the surface of the polytetrafluoroethylene article, with the removal of fluorine atoms in the form of the metal fluoride and the formation of new carbon-to-carbon or perhaps carbon-to-metal bonds at the treated surface, resulting in a surface which provides for improved adhesive anchorage of subsequently applied adhesive materials.

The reactivity of the metal with the polytetrafluoroethylene surface is evidenced by the presence of the corresponding metal fluoride in the water used to wash the treated film. Such water soluble materials must be removed from the film in order to provide the most effective activated surface.

Reaction of the alkali metals with the film surface is extremely rapid and occurs at temperatures well below the fusion temperature of the polytetrafluoroethylene. The alkaline earth metals are somewhat less reactive than the alkali metals and ordinarily require somewhat higher reaction temperatures. Since their melting and boiling points are substantially higher than those of the alkali metals their application to polytetrafluoroethylene surfaces by vapor deposition methods is somewhat more difficult.

The activating effect of alkali and alkaline earth metals on polytetrafluoroethylene surfaces is indicated by the improved adhesion of various adhesive materials to the surface after treatment. The reaction of these metals with the polytetrafluoroethylene material is also evidenced by the results of X-ray analysis of the treated surface. Typical examples have indicated the presence of calcium fluoride after treatment with calcium metal and of strontium fluoride and strontium carbide after treatment with strontium metal.

Useful results have also been obtained with certain other fluid metals; specifically, with manganese and zinc.

By "fluid metal" it is meant that the metal reactant is in a free-flowing state such that finely-divided mobile metallic particles contact the fluorocarbon surface, as distinguished from a solid metal mass. The metal particles at the time of reaction may be in a vapor form, solution form, or liquid form, and either in free form or in chemically combined form that releases reactive metal atoms or ions.

The presently claimed metals include all those shown in the electromotive series of the metals, as shown at page 1094 of Lange's Handbook of Chemistry, Fifth Edition, down to and including zinc, with the exception of aluminum, which has a combination of properties rendering it unsuitable for practical usage.

Where films treated with alkali or alkaline earth metals ordinarily are non-metallic in appearance, films treated with manganese, zinc, and in some cases magnesium, have usually retained the metallic appearance of these metals, particularly where the treated film was cooled from reaction temperature to room temperature prior to introduction of air into the vacuum coating chamber. The effectiveness of certain of these coatings in improving the bond of subsequently applied adhesives to the polytetrafluoroethylene film, as well as indications obtained in X-ray analysis, suggest that reaction may be made to occur at the interface between the polytetrafluoroethylene and the metallic coating where sufficiently high temperatures and other favorable conditions are employed. The metallic-appearing surface film then bonds to the reacted surface and provides an adhesive-receptive outer surface. However the excessively high temperatures required and the uncertainty of the results obtained with these metals makes their use much less attractive than in the case of the alkaline earth metals or more especially the alkali metals. The latter are preferred both because of ease of application of the metal and because of ease of removal of any unwanted reaction product, particularly such products as might be electrically conductive. For example, the alkali metals are rapidly converted to water-soluble hydroxides by contact with water, and the hydroxides and fluorides are easily removed by washing with water.

Films or other articles of unfused polytetrafluoroethylene are believed to have surface irregularities, whereas prefused articles are ordinarily dense and quite smooth. Where desired, the normal smooth surface of the latter type of product may be roughened prior to activation treatment, for example by sand blasting, to provide still greater area and to permit the establishing of still further improved bonds with adhesive and other materials.

As a further example of the effect of activation with various fluid metal reactants, there is appended a table of experimental adhesion values in which the effective adhesion of a standard pressure-sensitive adhesive tape to the activated surface of a fused polytetrafluoroethylene film is compared with the adhesion of the same adhesive tape to the untreated passive surface of such a film. In each case, the metal was applied by vapor deposition in a vacuum.

| Treatment: | Force of unwind |
|---|---|
| Untreated | 5 |
| Li | 23 |
| K | 14 |
| Na | 24 |
| Rb | 13.5 |
| Cs | 15 |
| Ca | 17 |
| Sr | 21 |
| Ba | 16 |
| Mg | 36 |
| Mn | 21 |
| Zn | 26 |

A further example using lithium vapor treatment in a carefully controlled continuous process gave consistent unwind values of about 35 on the same scale.

On the other hand, metals which do not react with the polytetrafluoroethylene film surface provide substantially no improvement in the bond between the pre-sintered film and adhesive materials applied thereto. As an example, specimens of pre-sintered polytetrafluoroethylene film which have been vapor-coated in a vacuum with copper, silver or gold are found to remain inactive toward pressure-sensitive adhesive tapes in tests made as described in Example III, and there is no evidence of the formation of soluble fluorides of such metals when thus applied.

What is claimed is as follows:

1. A method of activating a passive perfluorocarbon polymer surface of an article which comprises briefly contacting the surface with a metal reactive therewith and selected from the class consisting of the alkali metals, the alkaline earth metals, manganese and zinc at a temperature sufficient to cause reaction between the metal and the polymer, the reaction being confined to the surface and rendering it active toward organic adhesive coatings without degrading the bulk of the polymer.

2. The method of claim 1 in which the metal is applied by vapor deposition in a vacuum.

3. The method of claim 1 in which the metal is applied in solution in an amine-type non-aqueous volatile solvent.

4. The method of claim 1 in which the metal is applied as a component of a fusible metal alloy.

5. The method of claim 1 in which the metal is applied as the hydride.

6. The method of activating the passive surface of a polytetrafluoroethylene article which comprises briefly contacting said surface with a metal reactive therewith and selected from the class consisting of the alkali metals, the alkaline earth metals, manganese and zinc at a temperature sufficient to cause reaction between the metal and the polymer, the reaction being confined to the surface and rendering it active toward organic adhesive coatings without degrading the bulk of the polymer.

7. The method of claim 6 in which the metal is applied by vapor deposition in a vacuum.

8. The method of claim 6 in which the metal is applied in solution in an amine-type non-aqueous volatile solvent.

9. The method of claim 6 in which the metal is applied as a component of a fusible metal alloy.

10. The method of claim 6 in which the metal is applied as the hydride.

11. The method of activating the normally passive surface of a polytetrafluoroethylene article which comprises briefly contacting said surface with a dilute solution of an alkali metal in an amine-type non-aqueous volatile solvent.

12. The method of activating the normally passive surface of a polytetrafluoroethylene article which comprises briefly contacting said surface with a dilute solution of lithium metal in liquid ammonia.

13. The method of activating the normally passive surface of a polytetrafluoroethylene article which comprises briefly contacting said surface with a dilute solution of sodium metal in liquid ammonia.

14. An article having an initially passive perfluorocarbon polymer surface which has been activated by the method of claim 1.

15. The method of activating the normally passive surface of a perfluorocarbon polymer article which comprises briefly contacting said surface with a dilute solution of an alkali metal in an amine-type non-aqueous volatile solvent.

16. The method of activating the normally passive surface of a perfluorocarbon polymer article which comprises briefly contacting said surface with a dilute solution of an alkali metal in liquid ammonia.

17. The method of activating the normally passive surface of a perfluorocarbon polymer article which comprises briefly contacting said surface with a dilute solution of sodium metal in liquid ammonia.

18. The method of activating a normally passive surface of a thin film of a perfluorocarbon polymer which comprises briefly contacting said surface with a dilute solution of sodium metal in liquid ammonia.

References Cited in the file of this patent

UNITED STATES PATENTS

| 2,382,432 | McManus | Aug. 14, 1945 |
| 2,369,629 | Alfthan | Mar. 19, 1946 |
| 2,533,501 | Pendelton et al. | Dec. 12, 1950 |
| 2,642,625 | Peck | June 23, 1953 |
| 2,689,805 | Croze | Sept. 21, 1954 |

OTHER REFERENCES

Chemical Engineering, November 1949 pp. 120–124.